(12) United States Patent
Fangauer et al.

(10) Patent No.: US 12,366,280 B2
(45) Date of Patent: Jul. 22, 2025

(54) ACTUATOR DEVICE FOR ACTIVELY REDUCING, DAMPING AND/OR ABSORBING VIBRATIONS

(71) Applicant: ETO MAGNETIC GmbH, Stockach (DE)

(72) Inventors: Philipp Fangauer, Constance (DE); Peter Vincon, Stockach (DE)

(73) Assignee: ETO MAGNETIC GmbH, Stockach (DE)

( * ) Notice: Subject to any disclaimer, the term of this patent is extended or adjusted under 35 U.S.C. 154(b) by 777 days.

(21) Appl. No.: 17/609,872

(22) PCT Filed: May 8, 2020

(86) PCT No.: PCT/EP2020/062873
§ 371 (c)(1),
(2) Date: Jan. 31, 2022

(87) PCT Pub. No.: WO2020/229347
PCT Pub. Date: Nov. 19, 2020

(65) Prior Publication Data
US 2022/0221026 A1    Jul. 14, 2022

(30) Foreign Application Priority Data
May 10, 2019   (DE) .................. 10 2019 112 334.8

(51) Int. Cl.
*F16F 15/03*   (2006.01)
*B60K 5/12*    (2006.01)
(Continued)

(52) U.S. Cl.
CPC ............ *F16F 15/03* (2013.01); *B60K 5/1283* (2013.01); *H01F 7/081* (2013.01); *H01F 7/1615* (2013.01);
(Continued)

(58) Field of Classification Search
CPC .................................................. F16F 2222/06
See application file for complete search history.

(56) References Cited

U.S. PATENT DOCUMENTS 3,329,864 A * 7/1967 Michel .................... H05H 1/11
                                                 315/111.61
4,306,206 A   12/1981 Myers
(Continued)

FOREIGN PATENT DOCUMENTS

DE           3152049 C2   9/1982
DE      102013202166 A1   8/2014
(Continued)

OTHER PUBLICATIONS

English Machine Translation of International Search Report dated Aug. 13, 2020, issued in International Patent Application No. PCT/EP2020/062873.
(Continued)

*Primary Examiner* — Melody M Burch
(74) *Attorney, Agent, or Firm* — Posz Law Group, PLC (57) ABSTRACT

An actuator device for active reduction, damping and/or absorption of vibrations, in particular of vibrations generated by an external device, includes at least one movably supported armature element and at least one permanent magnet, which is coupled with the armature element, in particular an outer side of the armature element, and which extends around the armature element at least section-wise, in particular in a ring shape,
wherein at least in an axial direction of the armature element, which runs at least substantially parallel to a main movement axis of the armature element, the permanent magnet is encapsulated by the armature element, in particular at least on two sides.

19 Claims, 3 Drawing Sheets

(51) Int. Cl.
*H01F 7/08* (2006.01)
*H01F 7/16* (2006.01)

(52) U.S. Cl.
CPC ..... *F16F 2222/06* (2013.01); *F16F 2228/066* (2013.01); *H01F 2007/086* (2013.01); *H01F 2007/1692* (2013.01)

(56) References Cited

U.S. PATENT DOCUMENTS

| | | | |
|---|---|---|---|
| 6,105,943 A | 8/2000 | Nagasawa | |
| 2011/0001591 A1* | 1/2011 | Puth | H01F 7/1615 335/229 |
| 2015/0183443 A1 | 7/2015 | Iwamura et al. | |
| 2016/0006333 A1 | 1/2016 | Kemnitz et al. | |
| 2017/0328441 A1* | 11/2017 | Kanaya | F16F 13/26 |
| 2017/0346363 A1* | 11/2017 | Kanaya | H02K 33/16 |
| 2018/0233260 A1 | 8/2018 | Franz et al. | |
| 2019/0070946 A1 | 3/2019 | Werner et al. | |

FOREIGN PATENT DOCUMENTS

| | | | |
|---|---|---|---|
| DE | 112013003296 T5 | 3/2015 | |
| DE | 102014200647 A1 | 7/2015 | |
| EP | 3364532 A1 | 8/2018 | |
| EP | 3451510 A1 | 3/2019 | |
| EP | 3454349 A1 | 3/2019 | |
| JP | 2017204988 A * | 11/2017 | |
| WO | WO-2014122312 A1 * | 8/2014 | ........... B60K 5/1283 |

OTHER PUBLICATIONS

Office Action dated Dec. 9, 2019, issued in corresponding DE Patent Application No. 102019112334.8 (and English Machine Translation).

International Preliminary Report on Patentability dated Nov. 16, 2021, issued in corresponding International Application No. PCT/EP2020/062873.

Office Action dated Oct. 27, 2023 issued in corresponding Chinese Patent Application No. 202080045671.3 (and English Summary).

* cited by examiner

ACTUATOR DEVICE FOR ACTIVELY REDUCING, DAMPING AND/OR ABSORBING VIBRATIONS

CROSS REFERENCE TO RELATED APPLICATIONS

This application is a U.S. national stage application of PCT/EP2020/062873 filed on May 8, 2020, which is based on German Patent Application No. 10 2019 112 334.8 filed on May 10, 2019, the contents of which are incorporated herein by reference.

STATE OF THE ART

The invention concerns an actuator device for active reduction, damping and/or absorption of vibrations, a magnetic actuator, a vibration-damped engine mount and a method with the actuator device.

An actuator device for active vibration reduction has already been proposed, with at least one movably supported armature element and with at least one permanent magnet, which is coupled with the armature element and extends at least section-wise around the armature element.

The objective of the invention is in particular to provide a generic device having advantageous characteristics in regard to efficiency, in particular mounting efficiency. The objective is achieved according to the invention.

Advantages of the Invention

The invention is based on an actuator device for active reduction, damping and/or absorption of vibrations, in particular of vibrations generated by an external device, with at least one movably supported armature element and with at least one permanent magnet, which is coupled with the armature element, in particular an outer side of the armature element, preferably an outer diameter of the armature element, and which extends around the armature element at least section-wise, in particular in a ring shape.

It is proposed that at least in an axial direction of the armature element, which runs at least substantially parallel to an, in particular designated, main movement axis of the armature element, the permanent magnet is encapsulated by the armature element, in particular at least on two sides, preferably on exactly two sides, advantageously at least on three sides, preferentially on exactly three sides, and especially preferentially on no more than three sides. As a result, advantageous characteristics in regard to efficiency, in particular mounting efficiency, are achievable. It is in particular advantageously possible to simplify a fitting of permanent magnets into the armature element. Moreover, it is advantageously possible to do without permanent magnets which are situated outside in the axial direction of the armature element. On the one hand, this advantageously allows reducing a number of required cost-intensive permanent magnets, thus in particular achieving a high degree of cost efficiency. On the other hand, in this way a high stability and/or damage resistance of the magnet armature against impacts is achievable, in particular as a risk of ruptures and/or chipping of axially outside-situated components in the case of a heavy impact of the armature element in the axial direction of the armature element is considerably greater with the permanent magnet than with an iron core. It is also advantageously possible to augment mounting efficiency, in particular as a mounting of closely-arranged permanent magnets on the armature element, which is in particular especially complex due to the mutual attraction and repulsion of the permanent magnets, is simplified due to the reduced number of required permanent magnets. The proposed implementation furthermore allows achieving advantageous construction space efficiency, in particular an actuator device with particularly little, in particular axial, construction space.

An "actuator device" is in particular to mean, in this context, a magnetic actuator device. In particular, the actuator device constitutes at least a portion, in particular a subassembly, of a magnetic actuator. Advantageously the actuator device is configured at least for a use in an engine mount, in particular a vibration-damped engine mount. In particular, the actuator device, preferably the magnetic actuator, is configured for an active reduction, damping and/or absorption of an externally generated vibration. In particular, the actuator device, preferably the magnetic actuator, is configured to generate vibrations which actively damp the externally generated vibrations. In particular, the actuator device, preferably the magnetic actuator, is configured to generate vibrations which are oriented counter to the externally generated vibrations.

By an "armature element" is furthermore a component to be understood which is configured, during operation of the actuator device, to execute a movement that determines the function of the actuator, for example a vibration-damped counter vibration. Preferably the armature element can be influenced via a magnetic signal, in particular a magnetic field. In particular, the armature element is configured to exert a movement, in particular a linear movement, in reaction to a magnetic signal. In particular, the armature element is here implemented at least partially of a magnetically active, in particular (ferro)magnetic and/or magnetizable material, advantageously of iron and/or of soft-magnetic steel. In particular, the armature element forms a solenoid plunger, respectively a plunger core, of a magnetic actuator, in particular of a lifting magnet, which is in particular movable at least within an interior of at least one magnet coil, in particular hollow coil, of the magnetic actuator. In particular, the magnet coil of the magnetic actuator is configured to generate the magnetic field that is configured to interact with the armature element and/or to accelerate the armature element toward a central longitudinal axis of the magnetic actuator, in particular of the magnet coil.

In particular, the actuator device comprises at least two, preferably exactly two, permanent magnets, which are coupled with the armature element. The permanent magnets are in particular configured so as to extend around the entire armature element. In particular, the two permanent magnets are arranged in such a way that they adjoin each other in the axial direction in close neighborhood and/or in close contact. The term "in close neighborhood" is in particular to mean having an axial distance of less than 2 mm, preferably less than 1 mm, advantageously less than 0.5 mm, preferentially less than 0.1 mm and especially preferentially less than 0.01 mm. The permanent magnet, respectively the permanent magnets, is/are in particular firmly coupled with the armature element, preferably coupled with the armature element in a force-fit and/or form-fit manner. Preferentially the permanent magnets are glued to the armature element. However, it is alternatively also conceivable, for example, that the permanent magnets are clamped with the armature element, in particular in a form-fit manner. The permanent magnets are in particular embodied as (sintered) NdFeB magnets. However, alternatively other types of permanent magnets are also conceivable, which preferably have a comparably high magnetization.

By the permanent magnet being "encapsulated in the axial direction" is in particular to be understood that the permanent magnet is covered above and/or below by the armature element, in particular the armature element made of a ferromagnetic material, at least in the axial direction. In particular, the permanent magnet forms something like a hollow cylinder. In particular, a surface of the hollow-cylinder-shaped permanent magnet, which is arranged perpendicularly to an enveloping surface of the hollow-cylinder-shaped permanent magnet, in particular an annulus of the permanent magnet, is in the encapsulated state covered at least partially, preferably entirely by the armature element, in particular the armature element made of a ferromagnetic material. In particular, preferably viewed in a perpendicular sectional view, the encapsulated permanent magnet is delimited by the armature element at least on two sides, preferably at least on three sides, preferentially on exactly three sides. In particular, preferably viewed in a perpendicular sectional view, the entirety of the permanent magnets coupled with the armature element are delimited by the armature element at least on three sides, preferentially on exactly three sides. The axial direction in particular runs centrally through the magnetic actuator, the magnet coil and/or the armature element. In particular, the axial direction realizes a rotational symmetry axis of the permanent magnet and/or of the armature element. In particular, the permanent magnet encapsulated by the armature element is free of coverage by the armature element at least on one side of the permanent magnet.

"At least substantially parallel" is here in particular to mean an orientation of a direction relative to a reference direction, in particular in a plane, the direction having a deviation from the reference direction that is in particular smaller than 8°, advantageously smaller than 5° and especially advantageously smaller than 2°. "Configured" is in particular to mean specifically programmed, designed and/or equipped. By an object being configured for a certain function shall in particular be understood that the object fulfills and/or realizes said certain function in at least one application state and/or operation state.

It is further proposed that in a radial direction of the armature element, in particular in a radial direction of the armature element that points radially outwards, the permanent magnet forms a surface of the armature element. This in particular allows achieving advantageous characteristics in regard to efficiency, in particular energy efficiency. Advantageously, a distance between the magnet coil and the permanent magnet can be kept advantageously short. This advantageously allows achieving particularly favorable force transmission of the magnetic field of the magnet coil onto the armature element and/or an especially advantageous coupling of the magnetic fields of the magnet coil and of the permanent magnet. Moreover, a high level of construction space efficiency is advantageously achievable. The radial direction of the armature element in particular runs perpendicularly to the axial direction of the armature element. In particular, the armature element forms a recess, which is preferably implemented as some kind of a niche or furrow, which is in particular implemented so as to extend around the armature element and which is preferably configured to accommodate at least the permanent magnet. Preferentially the recess is configured to accommodate at least one further permanent magnet, particularly preferentially exactly one further permanent magnet. In particular, the recess forms a receiving region for the permanent magnets.

If the permanent magnet is magnetized radially, particularly advantageous coupling of the magnetic fields of the magnet coil and of the permanent magnet is achievable. Advantageously, an especially favorable and/or effective controlling of a movement of the armature element and/or of a vibration absorption induced by the armature element are/is enabled. In particular, the permanent magnet is implemented at least substantially in a ring shape. Magnetic poles of a radially magnetized, in particular ring-shaped, permanent magnet are arranged in particular on sides of the permanent magnet which are situated opposite each other in a radial direction of the permanent magnet. In particular, a first magnetic pole of the permanent magnet extends in a circumferential direction of the permanent magnet along a radially outside-situated side of the permanent magnet. In particular, a second magnetic pole of the permanent magnet extends in the circumferential direction of the permanent magnet along a radially inside-situated side of the permanent magnet.

It is moreover proposed that the armature device comprises at least one, in particular exactly one, further permanent magnet, which is encapsulated by the armature element in the axial direction of the armature element and which—except for a radial magnetization that is inverse with respect to the permanent magnet—is implemented at least substantially identically to the permanent magnet. This in particular allows achieving advantageous characteristics regarding efficiency, in particular energy efficiency. Advantageously, particularly favorable force transmission of the magnetic field of the magnet coil to the armature element and/or particularly advantageous coupling of the magnetic fields of the magnet coil and of the permanent magnet are/is achievable. Furthermore, advantageously a high level of construction space efficiency is achievable. In particular, the permanent magnet and the further permanent magnet are together encapsulated by the armature element. In particular, the permanent magnet and the further permanent magnet are arranged on the armature element in close neighborhood, preferably contacting each other in the axial direction. The further permanent magnet is in particular magnetized radially. The two permanent magnets are in particular arranged relative to each other in such a way that they are in the axial direction free of further permanent magnets and/or of interconnected subregions of the armature element, which are connected in-between. In particular, the two permanent magnets completely overlap in the axial direction. In particular, the two permanent magnets are free of mutual offset, in particular perpendicularly to the axial direction. It is conceivable that the actuator device comprises more than two permanent magnets, in particular permanent magnets which are radially polarized inversely, whereas the implementation with exactly two permanent magnets is the preferred implementation. The term "at least substantially identically" is in particular to mean identically with the exception of manufacturing tolerances, preferably having outer dimensions which are identical with the exception of manufacturing tolerances. By an "inverse" radial magnetization is in particular to be understood that a region forming a magnetic north pole of the first permanent magnet forms a magnetic south pole in the second permanent magnet, and vice versa.

Beyond this it is proposed that the actuator device comprises at least two magnet coils, whose coil windings extend around the armature element in the circumferential direction of the armature element. This in particular allows achieving advantageous characteristics regarding efficiency, in particular energy efficiency. Advantageously, particularly favorable force transmission of the magnetic field of the magnet coil to the armature element and/or especially advantageous coupling of the magnetic fields of the magnet coil and of the permanent magnet are/is achievable. Advantageously, a particularly favorable performance of the actuator device, in particular an especially effective vibration absorption, is achievable by two magnet coils. Moreover, a high level of construction space efficiency is advantageously achievable. In particular, the first magnet coil is arranged along the axial direction on a level with the first permanent magnet, in particular at least in a resting state of the magnetic actuator. In particular, the second magnet coil is arranged along the axial direction on a level with the second permanent magnet, in particular in at least one resting operation state of the magnetic actuator.

If the coil windings of the two magnet coils have mutually opposed winding directions, a particularly high efficiency and/or a particularly favorable performance of the actuator device are/is achievable. In particular, the two magnet coils have a common power supply. In this way advantageously, with a simultaneous current feed of the two magnet coils by means of the common power supply, differently oriented magnetic fields are generated by the two magnet coils. Advantageously, a separate power supply of the two magnet coils can be dispensed with. This advantageously allows achieving high energy efficiency as well as high construction space efficiency. In particular, with a current feed of the two magnet coils, due to the opposed winding directions a magnetic field is generated inducing the armature to deflect in such a way that, at respective transitions of the magnet coils to magnet yokes which are arranged relative to the magnet coils in the axial direction, favorable magnetic transitions into a magnetic north pole or into a magnetic south pole are induced, as a result of which the respective permanent magnet is pushed out of the region of the corresponding magnet yokes. Advantageously, in this way, in particular by means of a polarity inversion, of the power supply, dynamically very high axial forces can be built up. In particular, the coil windings of the two magnet coils are electrically connected, preferably electrically connected in series or electrically connected in parallel. Alternatively or additionally it is conceivable that the actuator device comprises more than two magnet coils. Advantageously a number of magnet coils of the actuator device corresponds to a number of permanent magnets encapsulated in the armature element.

It is further proposed that the actuator device comprises at least one magnet yoke which is, viewed in the axial direction of the armature element, arranged between the two magnet coils. In particular, this allows achieving advantageous characteristics in regard to efficiency, in particular energy efficiency. Advantageously, particularly favorable force transmission of the magnetic field of the magnet coil onto the armature element and/or particularly advantageous coupling of the magnetic fields of the magnet coil and of the permanent magnet are/is achievable. In particular, the actuator device comprises a magnetic circuit that is—at least to a large extent—closed. A "large extent" is to mean, in this context, in particular at least 66%, preferably at least 75%, advantageously at least 80%, preferentially at least 90%, and especially preferentially maximally 90%. In particular, the magnetic circuit is implemented by magnetic-field-bearing elements, in particular iron components. In particular, the magnetic circuit forms a magnet core of one of the magnet coils, preferably the magnet cores of the magnet coils. In particular, the magnetic circuit is implemented by immobile and by mobile components, in particular iron components.

In particular, the armature element forms a mobile component, in particular a mobile iron component, of the magnetic circuit. In particular, a magnet yoke forms an immobile component, in particular an immobile iron component, of the magnetic circuit. Preferably the iron circuit comprises a plurality of magnet yokes. In particular, each magnet coil of the actuator device comprises a magnetic circuit that is to a large extent closed, in particular a magnet core. In particular, a magnet yoke may be part of several magnetic circuits and/or magnet cores. In particular, the magnet yoke is arranged centrally between the magnet coils. In particular, the magnet yoke fills an interspace between the magnet coils at least to a large extent, preferably completely.

In addition, it is proposed that the actuator device comprises at least one further magnet yoke which, viewed in the axial direction of the armature element, is arranged above or below the two magnet coils. In particular, this allows achieving advantageous characteristics in regard to efficiency, in particular energy efficiency. Advantageously, particularly favorable force transmission of the magnetic field of the magnet coil to the armature element and/or an especially advantageous coupling of the magnetic fields of the magnet coil and of the permanent magnet are/is achievable. Preferentially the actuator device comprises at least two further magnet yokes, wherein a first further magnet yoke is arranged above the two magnet coils and a second further magnet yoke is arranged below the two magnet coils. The magnet yokes are in particular configured, in a current feed of the corresponding magnet coils, to form respectively one magnet pole on the ends of the magnet coils. In particular, the magnet coils are configured to be fed with current in such a way that in each case a magnet pole is formed at the ends of the magnet yoke, which has a polarity that differs from the polarity of the respective permanent magnet adjoining the respective magnet yoke. In particular, each of the three magnet yokes forms a web/disk extending perpendicularly to the axial direction of the armature element and/or of the magnet coil. In particular, the actuator device comprises three magnet yokes, two opposed magnet coils and/or an armature element with two permanent magnets which in at least one operation state, together with the parts of the armature element forming the encapsulation, realize in total four magnet poles. In particular, the permanent magnets implement two magnet poles of said four magnet poles, and the parts of the armature element forming the encapsulation implement two further magnet poles of said four magnet poles.

Furthermore, it is proposed that, in at least one resting operation state, the permanent magnets are arranged relative to the magnet yokes in such a way that, viewed along the axial direction of the armature element, a transition from a north pole of one of the permanent magnets to a south pole of the other permanent magnet and/or a transition from a magnet pole of one of the permanent magnets to an, in particular soft-magnetic, part of the armature element forming the encapsulation are/is arranged on a level with the respective nearest magnet yoke, in particular of a web of the respective nearest magnet yoke which extends perpendicularly to the axial direction and/or on a level with a disk of the respective nearest magnet yoke which extends perpendicularly to the axial direction. This in particular allows achieving advantageous characteristics in regard to efficiency, in particular energy efficiency. Advantageously, an especially favorable performance of the actuator device is achievable. By a "resting operation state" is in particular an operation state to be understood in which the magnet coils are not fed with current.

It is also proposed that the transition of the magnet pole of one of the permanent magnets to one of the parts of the armature element which form the encapsulation, preferably an outside-situated end of one of the permanent magnets, is arranged offset relative to a center of the nearest magnet yoke in the axial direction of the armature element, in particular in a direction pointing towards the permanent magnet. In particular, this allows achieving advantageous characteristics in regard to efficiency, in particular energy efficiency. Advantageously, this allows increasing and/or maximizing a force that is obtainable by a movement of the armature element. In particular, the offset is at least 3%, preferably at least 5%, advantageously at least 7%, especially advantageously at least 10%, preferentially at least 12% and especially preferentially at least 15% of a total extension of the parts of the armature element which form the encapsulation in the axial direction.

In addition, it is proposed that the permanent magnet is arranged in the armature element in such a way that, on an end of the permanent magnet that is situated outside in the axial direction of the armature element, the magnetic field lines of a magnet pole of the permanent magnet that is situated inside in the radial direction of the armature element are guided back, through a material of a part of the armature element that forms the encapsulation, outwards to the magnet yoke. In particular, advantageous characteristics in regard to efficiency, in particular energy efficiency, are thus achievable. Advantageously, an especially advantageous coupling of the magnetic fields of the magnet coil and of the permanent magnet is achievable. In particular, as a result, on the ends of the magnet yokes, in particular ends of the web-like and/or disk-like portions of the magnet yokes, which face toward the armature element, in each case advantageously in particular the end-side magnet poles of the nearest magnet coils are formed.

Beyond this, it is proposed that, relative to the part of the armature element which forms the encapsulation, the permanent magnet is offset inwards toward a center of the armature element in a radial direction of the armature element. This advantageously allows ensuring that in a block, in particular in an abutment of the armature element on the magnet yoke caused by a radial movement of the armature element, a load path extends from the magnet yoke via the part of the armature element that forms the encapsulation, and thus advantageously not via the permanent magnet. This advantageously allows achieving an especially high stability and/or long lifetime, and thus efficiency, of the actuator device. In particular, the offset of the permanent magnet in the recess of the armature element is at least 3%, preferably at least 5%, advantageously at least 7%, especially advantageously at least 10%, preferentially at least 12% and especially preferentially at least 15% of a total extension of the permanent magnet in the radial direction of the armature element, and/or of the permanent magnet. In particular, the permanent magnet has an outside-situated outer diameter that is at least by the offset smaller than an outside-situated outer diameter of the part of the armature element forming the encapsulation. The part of the armature element forming the encapsulation is in particular implemented as a web-shaped and/or disk-shaped bulge of the armature element, which extends in the radial direction of the armature element. The bulge of the armature element in particular has the maximum outside-situated outer diameter of the armature element. A "center of the armature element" is in particular to mean a center of gravity of the armature element and/or a rotational symmetry axis of the armature element.

It is moreover proposed that the armature element comprises the receiving region, which is configured to accommodate at least the permanent magnet, the receiving region having radially offset elevations, in particular furrows and/or domes. This advantageously allows achieving high efficiency, in particular mounting efficiency, in particular as this results in a gap for receiving an adhesive between the radially offset elevations, said gap preferably preventing, during mounting, a displacement of the adhesive, caused by the attraction forces of the permanent magnet, from the receiving region and/or from a region between the permanent magnet and the armature element, in particular before complete hardening of the adhesive. Furthermore, a preferably short tolerance chain to the outside-situated outer diameter of the permanent magnet is advantageously achievable, which advantageously enables an especially high accuracy and/or particularly little asymmetry of the armature element.

It is further proposed that the armature element comprises in its interior at least one hollow space, which has at least one recess, in particular a furrow-like indentation, on an inner wall. Due to the hollow space, a particularly structurally lightweight armature element is obtainable, which in particular enables an actuator device with especially high dynamics. By the recess in the inner wall of the armature element, in particular especially advantageous magnetic guiding is achievable within the armature element. Advantageously, a split-up of the magnetic flux path of the permanent magnet into one portion running into the further permanent magnet and one portion that is conducted into the bulge of the armature element is obtainable by appropriate arrangement of the recess. This advantageously allows increasing efficiency, in particular energy efficiency, of the actuator device. In particular, the hollow space has on the inner wall at least one second recess, in particular a second furrow-like indentation. In particular, the second recess of the inner wall of the armature element is implemented at least substantially identically to the recess of the inner wall of the armature element. In particular, the hollow space of the armature element has a maximum diameter that is equivalent to at least 30%, advantageously at least 40%, especially advantageously at least 50%, preferably at least 60%, preferentially at least 70% and particularly preferentially no more than 80% of a maximum outer diameter of the armature element. In particular, the larger the hollow space, the more structurally lightweight the armature element will be, however with reduced stability.

If, in particular in at least one resting operation state, the recess of the inner wall of the armature element, in particular the furrow-like indentation, is arranged along the axial direction of the armature element at least substantially centrally on a level with the permanent magnet, an especially advantageous split-up of the magnetic field, in particular of the magnetic flux and/or of the magnetic field lines, is achievable within the armature element. This advantageously allows an increase of efficiency, in particular energy efficiency, of the actuator device. In particular, the second recess of the inner wall of the armature element, in particular the second furrow-like indentation, is arranged at least substantially centrally on a level with the second permanent magnet, in particular at least in the resting operation state. By a "substantially central" arrangement is in particular any arrangement to be understood which differs from a precisely central arrangement in the axial direction by maximally 10%, preferably by maximally 5%, preferentially by maximally 3% and particularly preferentially by no more than 1% of a total axial extension of the permanent magnet.

It is also proposed that the recess of the inner wall of the armature element comprises at least one side wall, which is angled relative to the axial direction of the armature element and/or relative to a radial direction of the armature element. In this way a particularly selective guiding of the magnetic field, in particular of the magnetic flux and/or of the magnetic field lines, are/is advantageously achievable within the armature element. This advantageously allows achieving especially high efficiency, in particular energy efficiency. In particular, an angle included by the side wall of the recess of the inner wall of the armature element and by the radial direction of the armature element is at least 5°, preferably at least 10°, advantageously at least 20°, especially advantageously at least 30°, preferentially at least 40° and particularly preferentially maximally 60°. For example, the angle included by the side wall of the recess of the inner wall of the armature element and the radial direction of the armature element is exactly 30°. In particular, the absolute values of the angles, which are respectively included by the two side walls of the recess of the inner wall of the armature element and by the radial direction of the armature element, are at least substantially identical, preferably at least substantially equal in size. In particular, the aperture directions of the angles, which are respectively included by the two side walls of the recess of the inner wall of the armature element with the radial direction of the armature element, are opposed to each other. The recesses of the inner wall of the armature element are in particular implemented as undercuts.

It is furthermore proposed that the actuator device comprises at least one spring element, in particular a disk spring, which is configured for a radial support of the armature element. In this way, advantageously an, in particular undesired, vibration of the armature element in the radial direction can be cushioned. As a result, a high level of operational safety is advantageously achievable.

In addition, it is proposed that the actuator device comprises at least one abutment element, which is configured to delimit a movement of the armature element along the axial direction. This advantageously allows restricting a movement range of the armature element, thus in particular achieving a high level of operational safety. The abutment element is in particular embodied as part of a housing of the actuator device and/or of the magnetic actuator and/or is arranged on the housing. Alternatively, the abutment element may be embodied as part of a holder of the spring element and/or may be arranged on the spring element. The abutment element is in particular implemented as a stationary and stable planar element.

It is moreover proposed that the actuator device comprises at least one damper element, which is configured to damp an abutment of the armature element on the abutment element. In this way it is advantageously possible to prevent damaging of the armature element and/or of the abutment element, thus advantageously achieving a high level of operational safety and/or a long lifetime of the actuator device. In particular, the damper element is implemented at least partially of an elastic material, for example a synthetic material, like an elastomer, or a rubber. Alternatively or additionally, the abutment element may be implemented at least partially of a metal having favorable damping characteristics, and/or may comprise a spring, for example a spiral compression spring. The damper element may in particular be integrated at least partially in the housing of the actuator device and/or may be mounted to the housing of the actuator device. Alternatively, the damper element may be integrated at least partially in the holder of the spring element and/or may be mounted to the spring element. Alternatively or additionally, the damper element and/or a further damper element may be integrated at least partially in the armature element or be mounted to the armature element.

Beyond this, a magnetic actuator with the actuator device for active reduction, damping and/or absorption of vibrations is proposed. This allows achieving advantageous characteristics regarding an efficiency of the magnetic actuator. By a "magnetic actuator" is in particular a drive-technical structural unit to be understood which, triggered by an electrical signal, creates a magnetic field inducing a mechanical movement of the armature element.

Furthermore, a vibration-damped engine mount with the magnetic actuator is proposed. This advantageously allows achieving particularly efficient vibration damping of a motor.

Moreover, a method with the actuator device is proposed.

The actuator device according to the invention, the magnetic actuator according to the invention, the engine mount according to the invention and the method according to the invention shall here not be limited to the application and implementation described above. In particular, in order to fulfill a functionality that is described here, the actuator device according to the invention, the magnetic actuator according to the invention, the engine mount according to the invention and the method according to the invention may comprise a number of individual elements, components, method steps and units that differs from a number given here.

DRAWINGS

Further advantages will become apparent from the following description of the drawings. In the drawings an exemplary embodiment of the invention is illustrated. The drawings, the description and the claims contain a plurality of features in combination. Someone skilled in the art will purposefully also consider the features separately and will find further expedient combinations.

It is shown in.

DESCRIPTION OF THE EXEMPLARY EMBODIMENT

Figure 1:
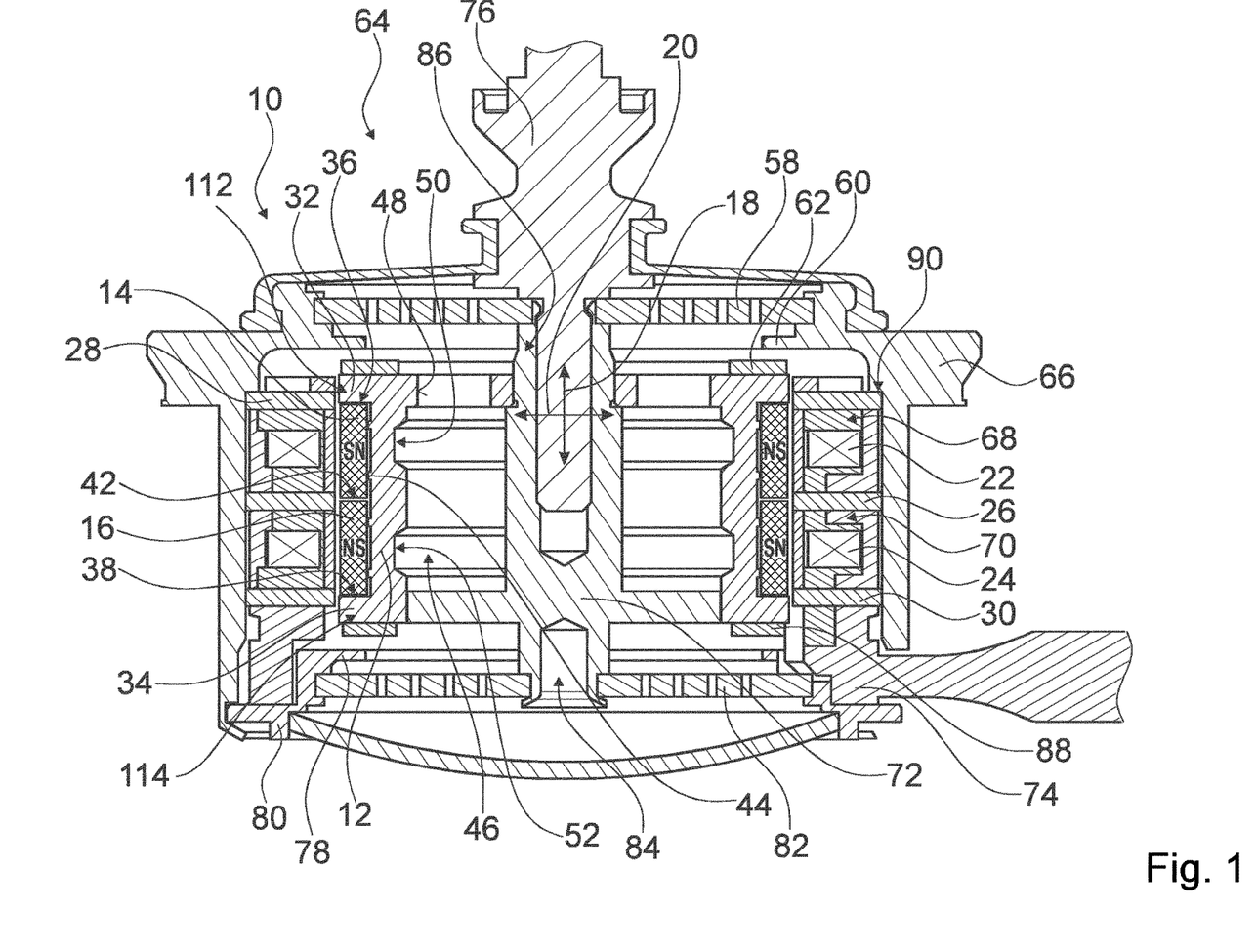
FIG. 1 a schematic sectional view of a magnetic actuator with an actuator device, FIG. 2 a schematic partial view of the actuator device with indicated magnetic field lines, FIG. 3 an enlargement of a portion of the schematic partial view of the actuator device, and FIG. 4 a flow chart of a method with the actuator device.

FIG. 1 shows a magnetic actuator 64. The magnetic actuator 64 constitutes part of a vibration-damped engine mount (not shown). The magnetic actuator 64 is implemented by overmolding. The magnetic actuator 64 comprises an overmold 74. By the overmold 74 the magnetic actuator 64 is advantageously sealed outwardly. The magnetic actuator 64 comprises an actuator device 10. The actuator device 10 comprises a housing 66. The actuator device 10 is configured for active reduction, damping and/or absorption of vibrations created by an external device. The actuator device 10 comprises an armature element 12. The armature element 12 is supported movably. The armature element 12 is supported movably at least relative to the housing 66. The armature element 12 is arranged within the housing 66. The armature element 12 is implemented so as to be rotationally symmetrical. Alternatively, the armature element 12 may also have at least slight deviations from a perfect rotational symmetry. The armature element 12 has a hollow space 46 in its interior. The hollow space 46 is realized so as to be continuous throughout the armature element 12 along an axial direction 18 of the armature element 18. The hollow space 46 serves for a weight reduction of the armature element 12. The hollow space 46 serves to increase dynamics of the armature element 12. The armature element 12 is embodied of a soft-magnetic steel. The armature element 12 is coupled with a shaft 72. The shaft 72 is in its turn coupled with a client interface 76. The client interface 76 is configured to establish a connection to the engine or to the engine mount whose vibrations are to be damped by the magnetic actuator 64.

The actuator device 10 comprises a permanent magnet 14. The actuator device 10 comprises a further permanent magnet 16. The permanent magnet 14 and the further permanent magnet 16 are non-releasably coupled with the armature element 12. The permanent magnet 14 and the further permanent magnet 16 are coupled with a radially outer side of the armature element 12. The permanent magnet 14 and the further permanent magnet 16 extend around the armature element 12 in a circumferential direction. The permanent magnet 14 and the further permanent magnet 16 extend around the armature element 12 in a ring shape. The permanent magnet 14 is magnetized radially. The further permanent magnet 16 is magnetized radially. The permanent magnet 14 and the further permanent magnet 16 have inverse radial polarizations. The further permanent magnet 16 is embodied at least substantially identically to the permanent magnet 14, except for its radial magnetization, which is inverse in comparison to the permanent magnet.

In the case shown in FIG. 1, the permanent magnet 14 has a magnetic south pole S, which is situated in a radial direction 20 outside, and a magnetic north pole N, which is situated in the radial direction 20 inside, while the further permanent magnet 16 has a magnetic north pole N, which is situated in the radial direction 20 outside, and a magnetic south pole S, which is situated in the radial direction 20 inside. This may also be respectively vice versa, without affecting the functionality of the actuator device 10. The permanent magnets 14, 16 are arranged directly adjoining each other along the axial direction 18 of the armature element 12. The permanent magnets 14, 16 are arranged along the axial direction 18 free of an offset relative to each other. The axial direction 18 of the armature element 12 runs parallel to a designated main movement axis of the armature element 12 in the actuator device 10.

The permanent magnet 14 is in the axial direction 18 of the armature element 12 encapsulated by the armature element 12 on two sides. The further permanent magnet 16 is in the axial direction 18 of the armature element 12 encapsulated by the armature element 12 on two sides. The two permanent magnets 14, 16 are together encapsulated by the armature element 12 on three sides in the axial direction 18 of the armature element 12. The armature element 12 forms a receiving region 42. The receiving region 42 is configured to accommodate the permanent magnets 14, 16. The receiving region 42 is configured to encapsulate the permanent magnets 14, 16 on three sides. The permanent magnet 14 and the further permanent magnet 16 form in the radial direction 20 of the armature element 12 a surface of the armature element 12. The armature element 12 delimits the permanent magnets 14, 16 in the axial direction 18 upwards. A first end 112 of the armature element 12 delimits the permanent magnets 14, 16 in the axial direction 18 upwards. A part 32 of the armature element 12 that encapsulates the permanent magnets 14, 16 delimits the permanent magnets 14, 16 in the axial direction 18 upwards. The armature element 12 delimits the permanent magnets 14, 16 in the axial direction 18 downwards. A second end 114 of the armature element 12 delimits the permanent magnets 14, 16 in the axial direction 18 downwards. A part 34 of the armature element 12 that encapsulates the permanent magnets 14, 16 delimits the permanent magnets 14, 16 in the axial direction 18 downwards. The ends 112, 114 of the armature element 12 are embodied as radially outward-protruding bulges and/or projections of the armature element 12. The parts 32, 34 of the armature element 12 which encapsulate the permanent magnets 14, 16 are embodied as radially outward-protruding bulges and/or projections of the armature element 12. The ends 112, 114 of the armature element 12 close the armature element 12 upwards and downwards in the axial direction 18.

The actuator device 10 comprises a first magnet coil 22. The actuator device 10 comprises a second magnet coil 24. The magnet coils 22, 24 in each case comprise a coil body 68, 70. The magnet coils 22, 24 comprise coil windings (not shown). The coil windings of the magnet coils 22, 24 are in each case wound on the corresponding coil bodies 68, 70. The coil windings of the magnet coils 22, 24 extend around the armature element 12 in the circumferential direction of the armature element 12. The coil windings of the two magnet coils 22, 24 have mutually opposed winding directions. In a resting operation state of the actuator device 10, respectively one of the magnet coils 22, 24 is arranged along the axial direction 18 on a level with one of the permanent magnets 14, 16.

The actuator device 10 comprises a magnetic circuit 90. The magnetic circuit 90 is implemented by a magnet core. The magnetic circuit 90 is implemented as an iron circuit, which may in particular also comprise parts made of soft-magnetic steel. The armature element 12 forms part of the magnetic circuit 90. The actuator device 10 comprises a first magnet yoke 26. The magnetic circuit 90 comprises the first magnet yoke 26. The first magnet yoke 26 is implemented of iron. The first magnet yoke 26 is configured to conduct a magnetic field of the magnet coils 22, 24. The first magnet yoke 26 forms part of the magnetic circuit 90. Viewed in the axial direction 18 of the armature element 12, the first magnet yoke 26 is arranged between the two magnet coils 22, 24. The first magnet yoke 26 is embodied in a disk shape. In a mounted state of the actuator device 10, the first magnet yoke 26 is implemented so as to be circulating around the armature element 12. The first magnet yoke 26 extends in the radial direction 20 inwards.

The actuator device 10 comprises a second magnet yoke 28. The magnetic circuit 90 comprises the second magnet yoke 28. The second magnet yoke 28 is implemented at least substantially identically to the first magnet yoke 26. The second magnet yoke 28 forms part of the magnetic circuit 90. Viewed in the axial direction 18 of the armature element 12, the second magnet yoke 28 is arranged above the two magnet coils 22, 24. The actuator device 10 comprises a third magnet yoke 30. The magnetic circuit 90 comprises the third magnet yoke 30. The third magnet yoke 30 is implemented at least substantially identically to the first magnet yoke 26. The third magnet yoke 30 forms part of the magnetic circuit 90. Viewed in the axial direction 18 of the armature element 12, the third magnet yoke 30 is arranged below the two magnet coils 22, 24.

Via the connection of the shaft 72 to the armature element 12, radial impacts can be transferred from the shaft 72 to the armature element 12 or vice versa. The actuator device 10 comprises a lower spring element 58. Viewed in the axial direction 18, the lower spring element 58 is connected to a lower end 84 of the shaft 72. The actuator device 10 comprises an upper spring element 82. Viewed in the axial direction 18, the upper spring element 82 is connected to an upper end 86 of the shaft 72, which is situated opposite the lower end 84 of the shaft 72. The spring elements 58, 82 are configured for a radial support of the armature element 12. The spring elements 58, 82 are configured for a damping of movements of the armature element 12 in radial directions 20 of the armature element 12. The spring elements 58, 82 are in each case embodied as disk springs.

The actuator device 10 comprises an abutment element 60. The actuator device 10 comprises a further abutment element 78. The abutment elements 60, 78 are configured to delimit a movement of the armature element 12 along the axial direction 18. The upper abutment element 60 is implemented integrally with the housing 66. The upper abutment element 60 is embodied as a disk-shaped projection of the housing 66, which extends in the radial direction 20 inwards. The lower abutment element 78 is implemented integrally with a spring holder 80 of the actuator device 10, which is configured for holding a spring element 58 of the actuator device 10. The lower abutment element 78 is embodied as a disk-shaped projection of the spring holder 80, which extends in the radial direction 20 inwards. However, other implementations of the abutment elements 60, 78 are conceivable.

"Integrally" is in particular to mean at least connected by substance-to-substance bond, for example via a welding process, a gluing process, an injection-molding process and/or a further process deemed expedient by someone skilled in the art, and/or advantageously formed in one piece, like for example by a production from a cast and/or by a production in a one-component or multi-component injection-molding procedure, and advantageously from a single blank.

The actuator device 10 comprises damper elements 62, 88. The damper elements 62, 88 are configured to damp impacts of the armature element 12 on the abutment elements 60, 78. The damper elements 62, 88 are implemented of an elastomer. The damper elements 62, 88 are implemented in a ring shape. However, other implementations of the damper elements 62, 88 are conceivable. The damper elements 62, 88 are in each case attached on sides of the armature element 12 which, viewed in the axial direction 18, form an upper side and an underside of the armature element 12. The damper elements 62, 88 are fastened on the armature element 12. The damper elements 62, 88 are arranged opposite the abutment elements 60, 78 in the axial direction 18. The damper elements 62, 88 overlap in the axial direction 18 at least partly with the abutment elements 60, 78. The axial direction 18 of the armature element 12 runs parallel to and/or overlaps with the axial directions 18 of the magnet coils 22, 24 or of the magnet yokes 26, 28, 30. The radial direction 20 runs perpendicularly to the axial direction 18.

Figure 2:
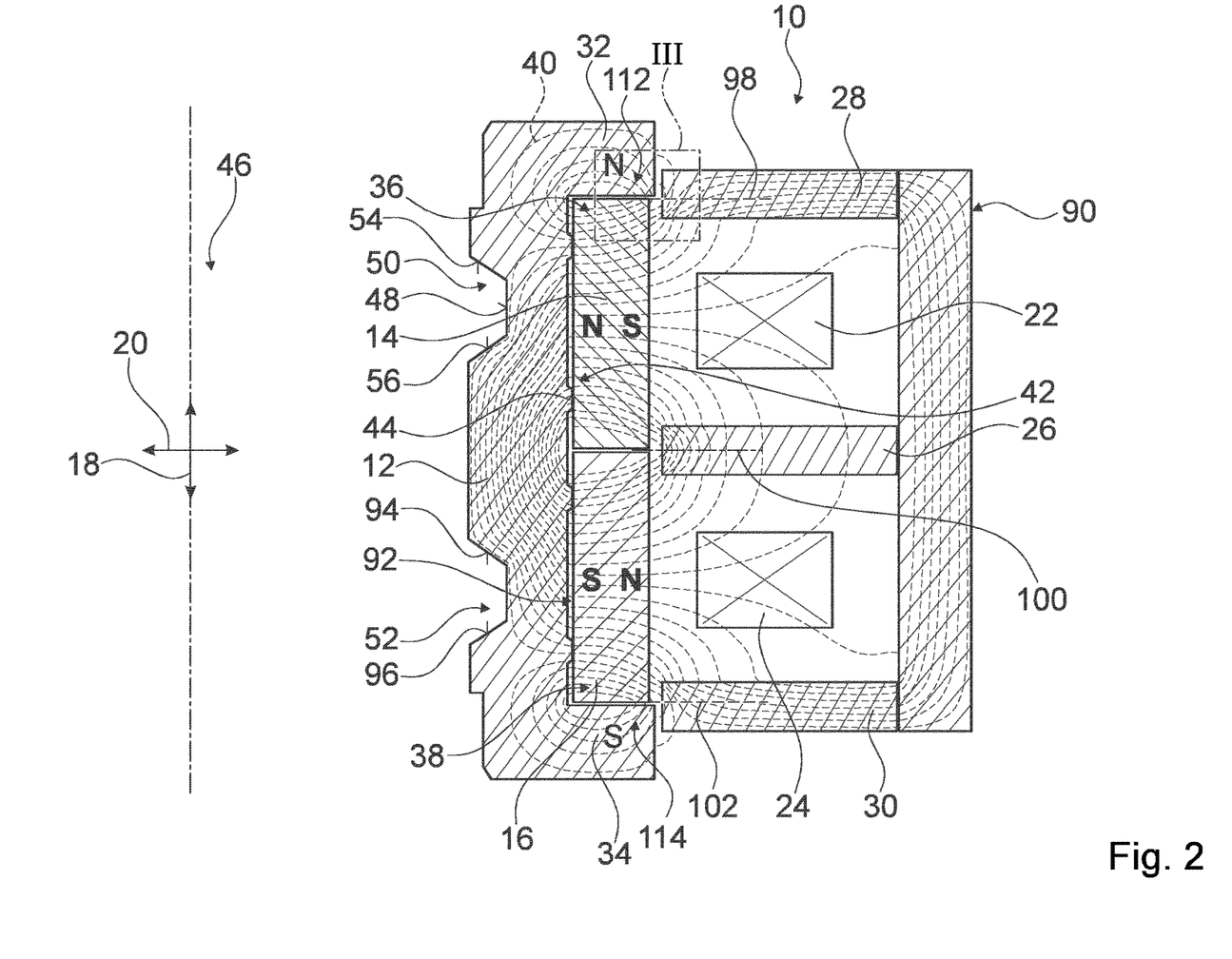

FIG. 2 shows a schematic partial view of the actuator device 10 with indicated magnetic field lines 40, in particular of the permanent magnets 14, 16. From the magnetic field lines 40 and the magnet poles N, S indicated in FIG. 2, it can be seen that the permanent magnet 14, 16 is arranged in the armature element 12 in such a way that, on an end 36, 38 of the permanent magnet 14, 16, which is situated outside in the axial direction 18 of the armature element 12, the magnetic field lines 40 of a magnet pole of the permanent magnet 14, 16, which is situated inside in the radial direction 20 of the armature element 12, are guided back, through the material of a part 32, 34 of the armature element 12, which forms the encapsulation, outwards to the outside-situated magnet yokes 28, 30. As a result, on the respective parts 32, 34 of the armature element 12, which form the encapsulation, magnet poles are realized which in each case correspond to the inside-situated magnet poles. It is thus advantageously possible to dispense with additional, cost-intensive permanent magnets above the permanent magnet 14 or below the further permanent magnet 16.

Positions of transitions 98, 100, 102 between the magnet poles are indicated in FIG. 2 along the axial direction 18 by horizontal lines. The transitions 98, 102 of magnet poles of one of the permanent magnets 14, 16 to one of the parts 32, 34 of the armature element 12 that form the encapsulation are arranged along the axial direction 18 at the outside-situated ends 36, 38 of the permanent magnets 14, 16. In the resting operation state, the permanent magnets 14, 16 are arranged relative to the magnet yokes 26, 28, 30 in such a way that, viewed along the axial direction 18 of the armature element 12, a transition from a north pole N of one of the permanent magnets 14, 16, for example the upper permanent magnet 14, to a south pole of the other permanent magnet 14, 16, for example the lower permanent magnet 16, is arranged on a level with the respective nearest magnet yoke 26, 28, 30. In the resting operation state, the permanent magnets 14, 16 and the parts 32, 34 of the armature element 12 that form the encapsulation are arranged relative to the magnet yokes 26, 28, 30 in such a way that, viewed along the axial direction 18 of the armature element 12, a transition 98, 102 from a magnet pole of one of the permanent magnets 14, 16 to the respective allocated parts 32, 34 of the armature element 12 forming the encapsulation is in each case arranged on a level with the respective nearest magnet yoke 26, 28, 30. The transition 98 from the part 32 of the armature element 12 forming the encapsulation and situated in the axial direction 18 at the top to the in the axial direction 18 upper permanent magnet 14 is in the resting operation state arranged on a level with the second magnet yoke 28. The transition from the part 34 of the armature element 12 forming the encapsulation and situated in the axial direction 18 at the bottom to the in the axial direction 18 lower permanent magnet 16 is in the resting operation state arranged on a level with the third magnet yoke 30. The transition 100 between the outside-situated magnet poles of the two permanent magnets 14, 16 is in the resting operation state arranged on a level with the first magnet yoke 26.

The receiving region of the armature element 12 comprises radially offset elevations 44. The radially offset elevations 44 extend in the radial direction 20 outwards. The radially offset elevations 44 extend in the radial direction 20 toward the permanent magnets 14, 16, which are arranged in the receiving region 42. The radially offset elevations 44 are configured to contact the permanent magnets 14, 16, which are coupled with the armature element 12. The radially offset elevations 44 are configured to form at a rear side of the receiving region 42 gaps 92 between the permanent magnets 14, 16 and the armature element 12. The gaps 92 may be configured for receiving an adhesive material for a fixation of the permanent magnets 14, 16 to the armature element 12.

The hollow space 46 in the interior of the armature element 12 comprises an inner wall 48. The hollow space has on its inner wall 48 a first recess 50. The hollow space 46 has on its inner wall 48 a second recess 52. The recesses 50, 52 are implemented as furrow-like deepenings and/or undercuts in the inner wall 48 of the hollow space 46. Respectively one of the recesses 50, 52 of the inner wall 48 of the armature element 12 is in the resting operation state arranged, along the axial direction 18 of the armature element 12, centrally and on a level with respectively one of the permanent magnets 14, 16. The recesses 50, 52 of the inner wall 48 of the armature element 12 in each case have two side walls 54, 56, 94, 96. The side walls 54, 56, 94, 96 of the recesses 50, 52 are angled with respect to the axial direction 18 of the armature element 12. The side walls 54, 56, 94, 96 of the recesses 50, 52 are angled by approximately 60° with respect to the axial direction 18 of the armature element 12. The side walls 54, 56, 94, 96 of the recesses 50, 52 are angled with respect to the radial direction 20 of the armature element 12. The side walls 54, 56, 94, 96 of the recesses 50, 52 are angled by approximately 30° with respect to the radial direction 20 of the armature element 12. As can be seen in FIG. 2, the recesses 50, 52 of the side walls 54, 56, 94, 96 of the hollow space 46 of the armature element 12 are configured to guide the magnetic field lines 40 of the permanent magnets 14, 16. The recesses 50, 52 of the side walls 54, 56, 94, 96 of the hollow space 46 of the armature element 12 are configured to split the magnetic field lines 40 of the permanent magnets 14, 16 up in an advantageous manner.

Figure 3:
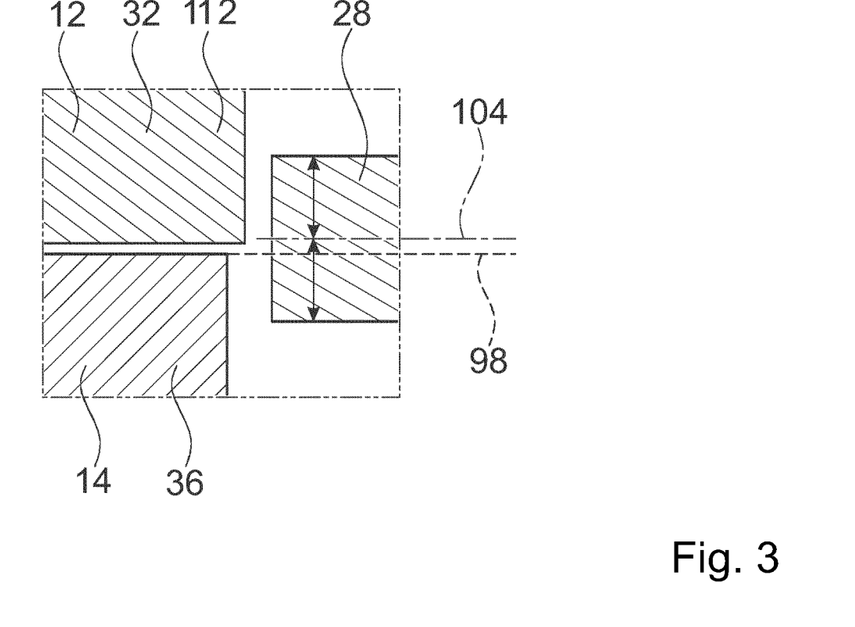

FIG. 3 shows an enlarged section (cf. the rectangle done in dashed lines in FIG. 2) of the actuator device 10 with the second magnet yoke 28, the upper part 32 of the armature element 12 that forms the encapsulation and the permanent magnet 14, in particular the upper outside-situated end 36 of the upper permanent magnet 14, in the resting operation state. The transitions 98, 102 of the magnet poles of the permanent magnets 14, 16 to the parts 32, 34 of the armature element 12 that form the encapsulation are in each case arranged offset, in the axial direction of the armature element 12, relative to a center 104 of the nearest magnet yoke 28, 30. The transitions 98, 102 of the magnet poles of the permanent magnets 14, 16 to the parts 32, 34 of the armature element 12 forming the encapsulation are in each case arranged offset, in the axial direction 18 of the armature element 12, toward the magnet coils 22, 24 and/or toward the first magnet yoke 26.

The permanent magnets 14, 16 are arranged offset, in the direction of the radial direction 20 of the armature element 12, relative to the parts 32, 34 of the armature element 12 that form the encapsulation. The permanent magnets 14, 16 are arranged offset, in the radial direction 20 of the armature element 12, relative to the parts 32, 34 of the armature element 12 that form the encapsulation, toward a center of the armature element 12. The permanent magnets 14, 16 are arranged offset inwards, in the radial direction 20 of the armature element 12, relative to the parts 32, 34 of the armature element 12 that form the encapsulation. A distance of the permanent magnets 14, 16 to the respective magnet yoke 26, 28, 30 that is situated opposite in the radial direction 20 is greater than a distance of the parts 32, 34 of the armature element 12 that form the encapsulation to the respective magnet yoke 26, 28, 30 that is situated opposite in the radial direction 20. The permanent magnets 14, 16 are in the receiving region 42 set back radially relative to the parts 32, 34 of the armature element 12 that form the encapsulation.

Figure 4:
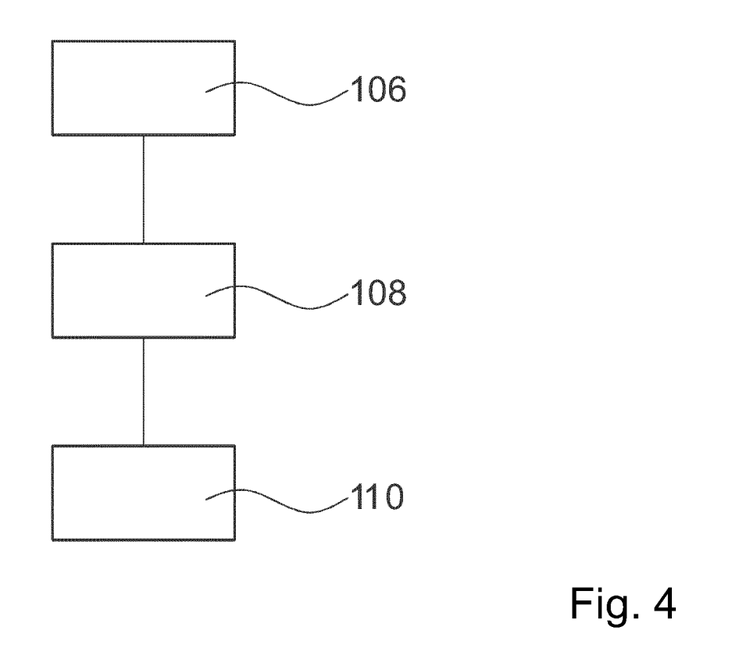

FIG. 4 shows a flow chart of a method with the actuator device 10. In at least one method step 106, a radially magnetized permanent magnet 14, 16 is arranged in the receiving region 42 of the armature element 12 in such a way that an inside-situated magnet pole of the radially magnetized permanent magnet 14, 16 is guided back outwards via a part 32, 34 of the armature element 12 that encapsulates the permanent magnet 14, 16, said magnet pole thus forming, in an axial direction 18 above or below the permanent magnet 14, 16, a magnet pole that is opposed to the outside-situated magnet pole of the adjoining permanent magnet 14, 16. In at least one further method step 108, a simultaneous current feed of the two magnet coils 22, 24 with different winding directions is generated by a common voltage supply (not shown), which results in a generation of opposite-oriented magnetic fields in the magnet coils 22, 24, which are arranged one above the other one in the axial direction 18. In at least one further method step 110, a movement of the armature element 12 is controlled via a selective current feed to the magnet coils 22, 24 in such a way that external vibrations are compensated, reduced and/or absorbed by the movement of the armature element 12.

The invention claimed is:

1. An actuator device for active reduction, damping and/or absorption of vibrations, with at least one movably supported armature element and with at least one permanent magnet and at least one further permanent magnet, which are coupled with the at least one armature element, and which extend around the at least one armature element at least section-wise, wherein at least in an axial direction of the at least one armature element, which runs at least substantially parallel to a main movement axis of the at least one armature element, the at least one permanent magnet and the at least one further permanent magnet are encapsulated by the at least one armature element, wherein the at least one armature element has a hollow space in its interior, wherein the hollow space in the interior of the at least one armature element comprises an inner wall, wherein the hollow space has on the inner wall a first recess and a second recess, wherein respectively one of the first recess and the second recess of the inner wall of the at least one armature element is arranged along the axial direction of the at least one armature element, centrally and on a level with the at least one permanent magnet and/or with the at least one further permanent magnet, further comprising at least two magnet coils, whose coil windings extend around the at least one armature element in a circumferential direction of the at least one armature element, and at least one magnet yoke which is, viewed in the axial direction of the at least one armature element, arranged between the at least two magnet coils.

2. The actuator device according to claim 1, wherein in a radial direction of the at least one armature element, the at least one permanent magnet forms a surface of the at least one armature element.

3. The actuator device according to claim 1, wherein the at least one permanent magnet is magnetized radially.

4. The actuator device according to claim 1, wherein the at least one further permanent magnet, —except for a radial magnetization that is inverse with respect to the at least one permanent magnet—is implemented at least substantially identically to the at least one permanent magnet.

5. The actuator device according to claim 1, further comprising at least one further magnet yoke which is, viewed in the axial direction of the at least one armature element, arranged above or below the at least two magnet coils.

6. The actuator device at least according to claim 5, wherein the at least one further permanent magnet—except for a radial magnetization that is inverse with respect to the at least one permanent magnet—is implemented at least substantially identically to the at least one permanent magnet, and wherein in at least one operation state, the at least one permanent and the at least one further permanent magnet are arranged relative to the at least one magnet yoke and the at least one further magnet yoke in such a way that, viewed along the axial direction of the at least one armature element, a transition from a north pole of one of the at least one permanent magnet and the at least one further permanent magnet to a south pole of the other one of the at least one permanent magnet and the at least one further permanent magnet and/or a transition from a magnet pole of the one of the at least one permanent magnet and the at least one further permanent magnet to a part of the at least one armature element that forms the encapsulation are/is arranged on a level with the respective nearest magnet yoke of the at least one magnet yoke and the at least one further magnet yoke.

7. The actuator device according to claim 6, wherein the transition from the magnet pole of the one of the at least one permanent magnet and the at least one further permanent magnet to one of the parts of the at least one armature element forming the encapsulation is arranged offset relative to a center of the nearest magnet yoke of the at least one magnet yoke and the at least one further magnet yoke in the axial direction of the at least one armature element.

8. The actuator device at least according to claim 1, wherein the at least one permanent magnet is arranged in the at least one armature element in such a way that, on an end of the at least one permanent magnet that is situated outside in the axial direction of the at least one armature element, the magnetic field lines of a magnet pole of the at least one permanent magnet that is situated inside in the radial direction of the at least one armature element are guided back, through a material of a part of the at least one armature element that forms the encapsulation, outwards to the at least one magnet yoke.

9. The actuator device according to claim 1, wherein relative to the part of the at least one armature element that forms the encapsulation, the at least one permanent magnet is offset inwards toward a center of the at least one armature element in a radial direction of the at least one armature element.

10. The actuator device according to claim 1, wherein the at least one armature element comprises a receiving region, which is configured to accommodate at least the at least one permanent magnet, the receiving region having radially offset elevations.

11. The actuator device according to claim 1, wherein the first recess and/or the second recess of the inner wall of the at least one armature element comprises at least one side wall, which is angled relative to the axial direction of the at least one armature element and/or relative to a radial direction of the at least one armature element.

12. The actuator device according to claim 1, further comprising at least one spring element, which is configured for a radial support of the at least one armature element.

13. The actuator device according to claim 1, further comprising at least one abutment element, which is configured to delimit a movement of the at least one armature element along the axial direction.

14. The actuator device according to claim 13, further comprising at least one damper element, which is configured to damp an abutment of the at least one armature element on the at least one abutment element.

15. A magnetic actuator with an actuator device for active reduction, damping and/or absorption of vibrations according to claim 1.

16. A vibration-damped engine mount with a magnetic actuator according to claim 15.

17. The actuator device according to claim 1, wherein the at least one permanent magnet and the at least one further permanent magnet are encapsulated by the at least one armature element on two sides or on three sides of the at least one permanent magnet and the at least one further permanent magnet.

18. The actuator device according to claim 1, wherein the at least one permanent magnet and/or the at least one further permanent magnet extends around the at least one armature element in a ring shape.

19. An actuator device for active reduction, damping and/or absorption of vibrations, with at least one movably supported armature element and with at least one permanent magnet and at least one further permanent magnet, which are coupled with the at least one armature element, and which extend around the at least one armature element at least section-wise, wherein at least in an axial direction of the at least one armature element, which runs at least substantially parallel to a main movement axis of the at least one armature element, the at least one permanent magnet and the at least one further permanent magnet are encapsulated by the at least one armature element, wherein the at least one armature element has a hollow space in its interior, wherein the hollow space in the interior of the at least one armature element comprises an inner wall, wherein the hollow space has on the inner wall a first recess and a second recess, wherein respectively one of the first recess and the second recess of the inner wall of the at least one armature element is arranged along the axial direction of the at least one armature element, centrally and on a level with the at least one permanent magnet and/or with the at least one further permanent magnet, wherein the at least one armature element comprises a receiving region, which is configured to accommodate at least the at least one permanent magnet, the receiving region having radially offset elevations.

* * * * *